United States Patent [19]
Rein

[11] Patent Number: 6,105,446
[45] Date of Patent: Aug. 22, 2000

[54] MEASURING DEVICE FOR SAW BLADES

[75] Inventor: Harry Rein, Tubingen, Germany

[73] Assignee: Walter AG, Germany

[21] Appl. No.: 09/270,143

[22] Filed: Mar. 16, 1999

[30] Foreign Application Priority Data

Mar. 17, 1998 [DE] Germany .......................... 198 11 459

[51] Int. Cl.[7] ................................................ G01M 13/00
[52] U.S. Cl. ............................................................ 73/865.9
[58] Field of Search ................................. 73/865.9, 104; 33/202, 534, 539, 569; 348/125, 86, 61

[56] References Cited

U.S. PATENT DOCUMENTS

| | | | |
|---|---|---|---|
| 5,163,334 | 11/1992 | Li et al. | 73/865.9 |
| 5,379,633 | 1/1995 | Flisram et al. | 73/104 |

FOREIGN PATENT DOCUMENTS

| | | | |
|---|---|---|---|
| 0 403 908 A2 | 6/1990 | European Pat. Off. . | |
| 3404257 | 8/1984 | Germany | 73/104 |
| 44 32 317 A1 | 3/1996 | Germany . | |

OTHER PUBLICATIONS

Broermann E.: Berührungslose Schneidenwinkelmessung in: Technisches Messen tm 57 (1990) 5, S. 198–203.

Opposition papers filed in corresponding German Application DE 198 11 459 C1.

*Primary Examiner*—Robert Raevis
*Attorney, Agent, or Firm*—Leydig, Voit & Mayer, Ltd.

[57] ABSTRACT

For the measuring of saw blades there is created a measuring device which has a receptacle for the turnable bearing of a saw blade as well as a measuring spindle which, with respect to the saw blade, is held adjustable and is born swingably about an axis parallel to the saw blade axis. On the measuring spindle there are arranged two measuring edges which together enclose an angle and are emplaceable on the cutting surface and on the release surface of a tooth. The measuring spindle has a low inertia moment and a friction-free bearing. This arrangement of components permits a simple and dependable execution of the measurement, even by inexperienced personnel, and the measurements of saw blades with different tooth sizes or states of wearing-down.

19 Claims, 5 Drawing Sheets

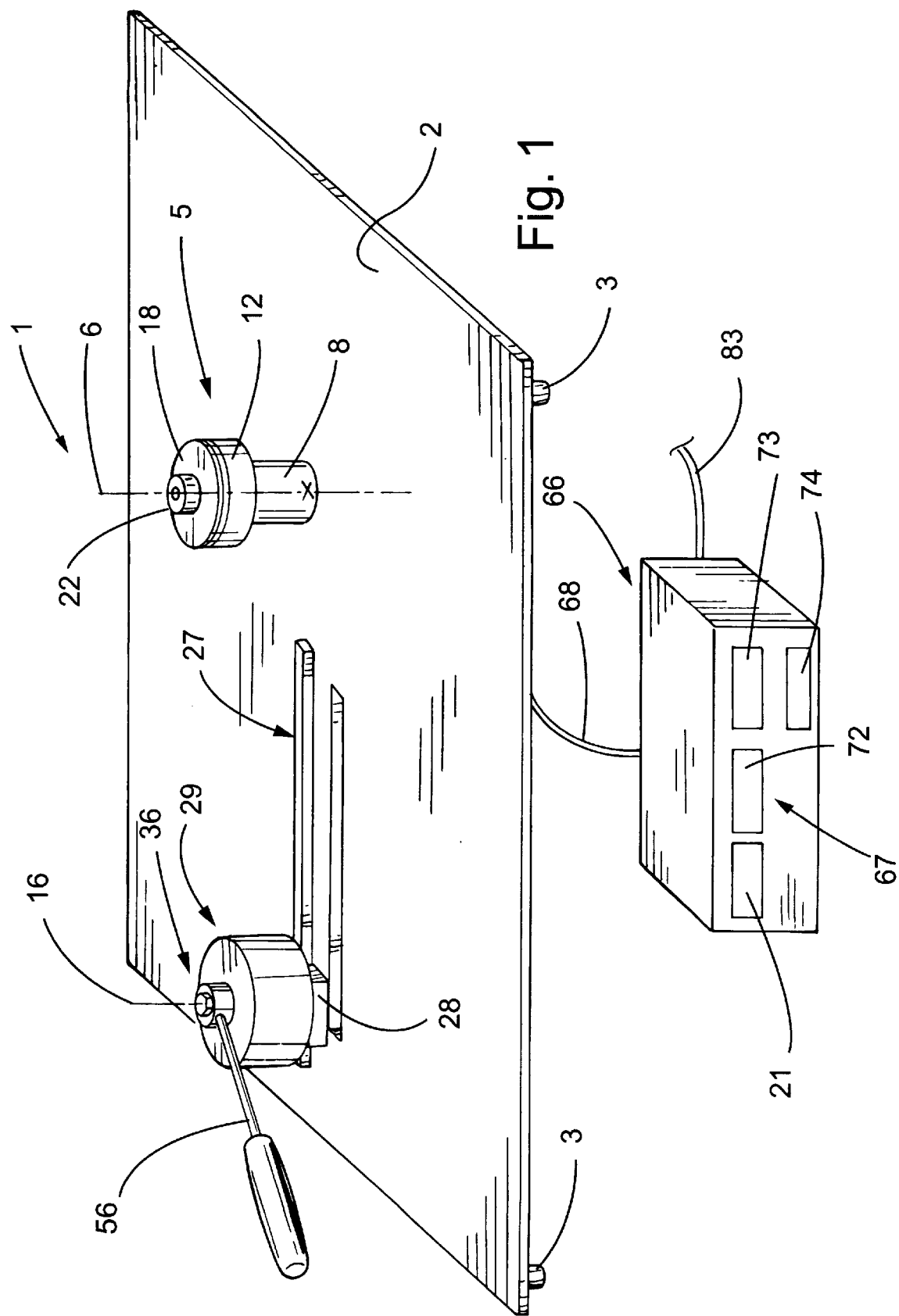

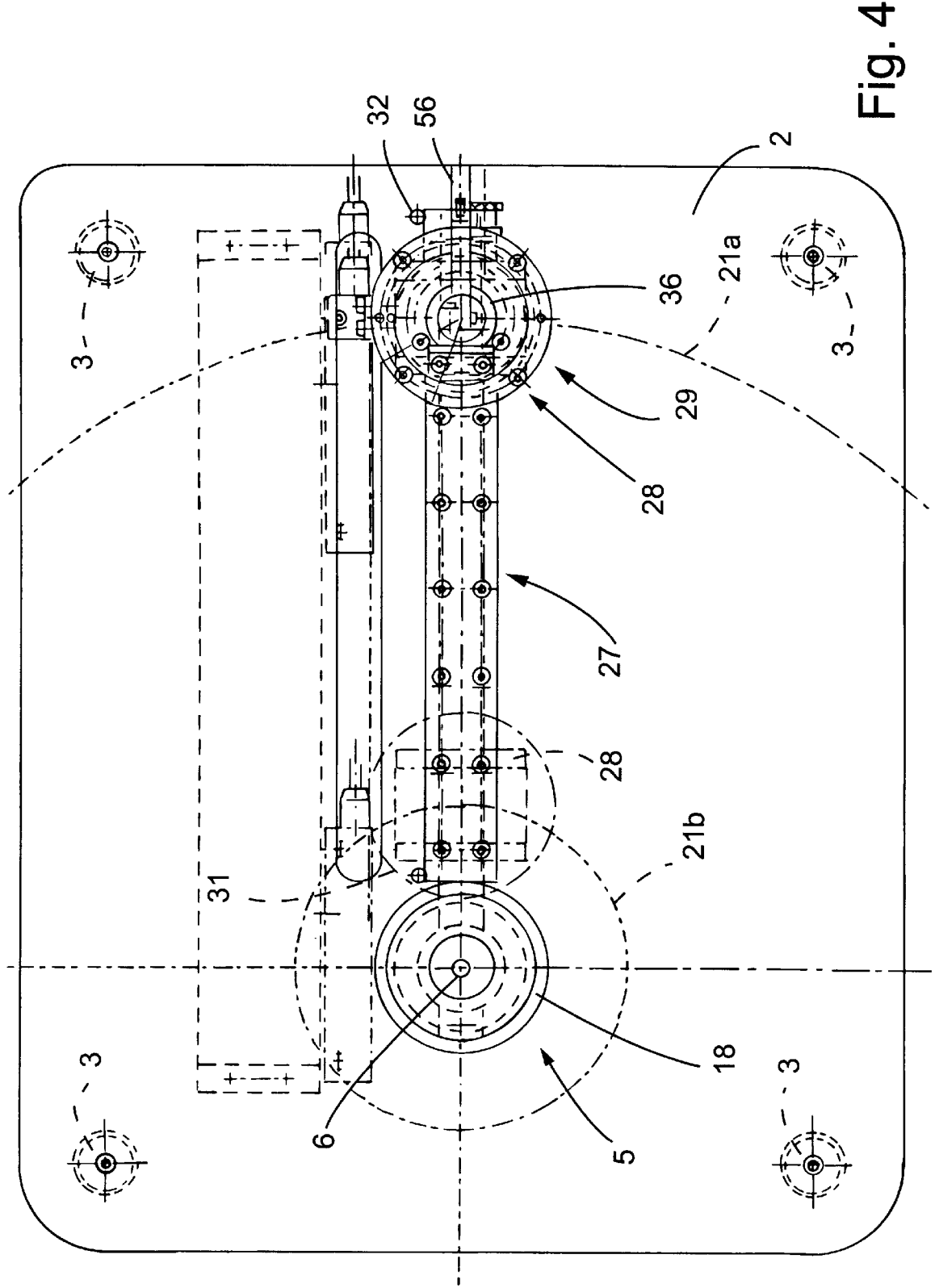

MEASURING DEVICE FOR SAW BLADES

TECHNICAL FIELD

This invention relates generally to measuring devices and, more particularly, relates to a device for measuring various characteristics of a saw blade.

BACKGROUND OF THE INVENTION

In connection with sharpening blunted saw blades, it is frequently necessary to determine the effective cutting angle and the relief angle on the teeth. As will be appreciated, a blunted saw blade has saw blade teeth on which the cutting surface and the relief surface have been rounded. Therefore, to sharpen the saw blade, the cutting surface and the relief surface of the saw blade teeth must be reground.

When regrinding the saw blade teeth, it is desired to keep as low as possible the material removal on the individual teeth and, therewith, the diameter loss of the saw blade. Furthermore, it is desired to maintain as near as possible the original cutting and relief angles of the saw blade. To accomplish these goals, the regrinding process demands a precise measurement of the cutting angle and the relief angle present on the saw blade. To this end, a need exists for a device capable of measuring at least the cutting angle and the relief angle of saw blades in a simple and dependable manner.

SUMMARY OF THE INVENTION

In accordance with this need, a measuring device is provided that has a receptacle for a circular saw blade. Within the receptacle the saw blade is received on its central opening in such manner that it is turnable about its central axis. This central axis agrees with the axis of rotation of the receptacle. When the saw blade is received within the receptacle, the teeth of the saw blade can be brought into engagement with measuring edges of a measuring spindle. The measuring edges have plane surfaces which, in swinging of the measuring spindle, can be brought into engagement at will with the cutting surface of the saw tooth or with its release surface. When the angular position of the measuring spindle provides uniform engagement between a measuring edge and a respective surface of the saw tooth, a measure for the cutting angle or the release angle of the tooth is obtainable.

In a further embodiment of the invention, the measuring device can be arranged for the measuring of the saw blade diameter. For this purpose, either the saw blade receptacle or the measuring spindle on the base stand are borne adjustably in such manner that the distance between the pivot axis of the measuring spindle and the axis of rotation of the receptacle can be altered. For the measurement of the distance, a sensor arrangement is held, for example, on the base stand. This sensor arrangement is preferably constructed as an absolute-value measuring arrangement which gives, therefore, a signal that directly indicates the distance between the pivot axis and the axis of rotation. Alternatively, it is possible to provide a sensor which determines the relative positions of the axes such as a sensor that delivers an impulse course corresponding to a displacement, which must then be computed.

In still a further embodiment of the invention, a counter for the number of teeth is provided. For this purpose, a sensor joined with the measuring spindle, or a carrier bearing this spindle, detects the passing-by of the teeth. The number of teeth is determinable if the saw blade, during counting of the teeth passing in front of the sensor, is rotated over a prescribed angular range. The angular range can amount to 360° and alternatively it is possible to provide other angles, in which the number of teeth then determined is to be converted in correspondence to the relation between the full circle and the angle of the measuring range.

From the foregoing, it will be appreciated that the subject invention has the advantage of providing a simple and economical measuring apparatus usable in large numbers of practical operations. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 1 illustrates a perspective view of a measuring apparatus constructed in accordance with the present invention;

FIG. 4 illustrates a plan view of the measuring apparatus illustrated in FIG. 1;

DETAILED DESCRIPTION OF THE INVENTION

Figures 2, 3:
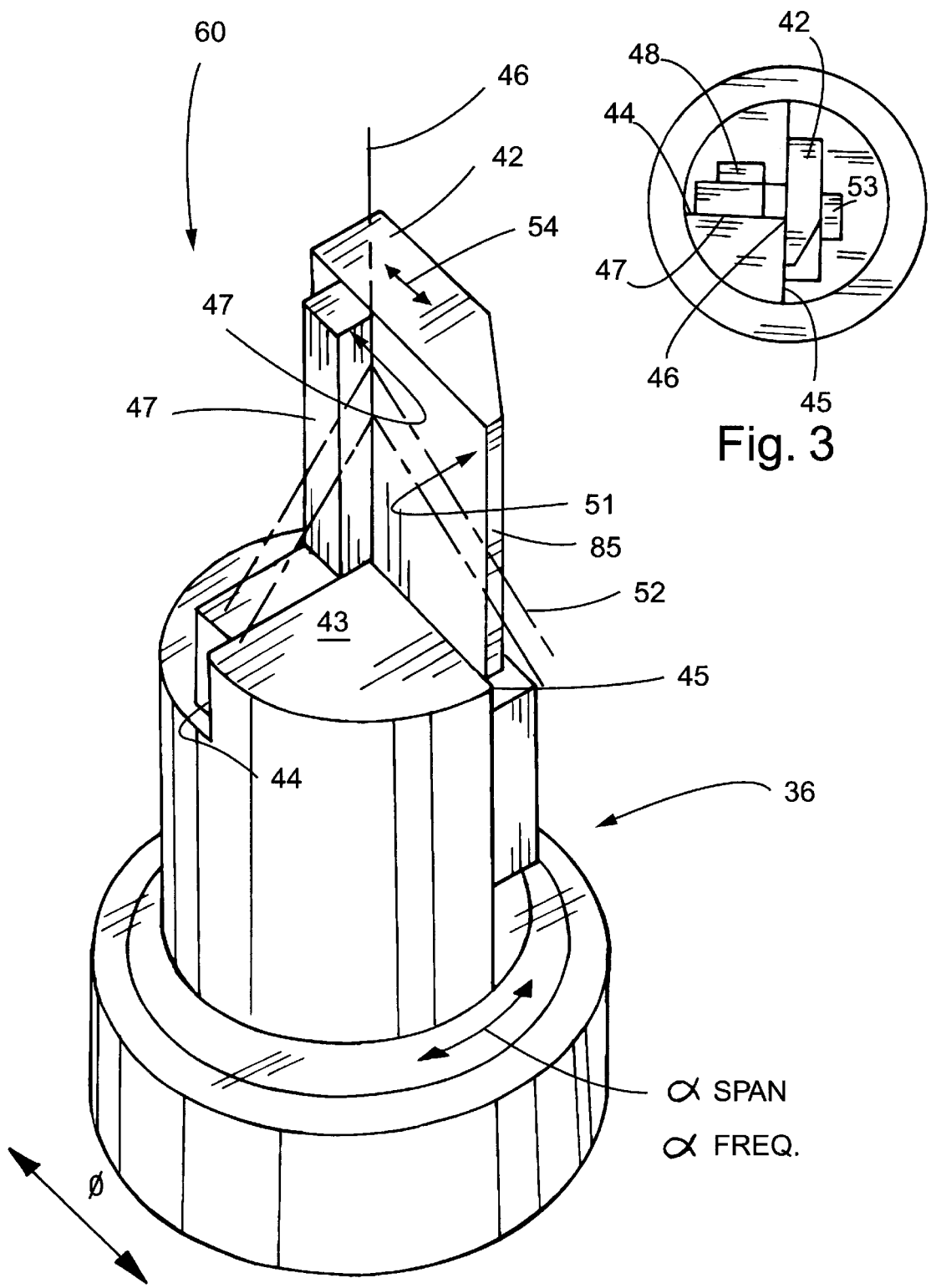
FIG. 2 illustrates a perspective view of the measuring spindle of the measuring apparatus illustrated in FIG. 1.
FIG. 3 illustrates a simplified plan view of the measuring spindle illustrated in FIG. 2.

Turning to FIGS. 1–6, wherein like reference numerals refer to like elements, a measuring device 1 is illustrated. The measuring device 1 has a table-type base stand 2 by which the measuring device 1 may be placed, for example, in the vicinity of a computer-controlled grinding machine. The base stand 2, provided with feet 3, is equipped with a receptacle 5, on which a circular saw blade is horizontally clampable. The receptacle 5 establishes a vertical axis of rotation 6. Details of the receptacle 5 are evident especially from FIG. 5.

On the base stand 2, which is formed essentially by a flat plate, there is fastened by means of machine screws, a vertical column 8, which has on its upper side a vertically upward pointing pin 9. On pin 9 there are seated two deep grooved ball bearings 11 or other-type roller bearings. Carried outside of the ball bearings 11 is a rotationally symmetrical clamping jaw 12, which has a horizontal annular clamping surface 13. Centrally and concentrically to the axis of rotation 6 there projects from the clamping jaw 12 a centering pin 14 which has a cylindrical section 15 for the bearing of a removable centering ring 16. The centering ring 16 is seated with little play on the centering pin 14 and has an outside diameter which is fitted to the hole diameter of the saw blade.

On the centering pin 14 there is further seated an upper clamping jaw 18 which is constructed flat and pot-shaped and has on its underside an annular clamping surface for the fast-clamping of a saw blade 21, indicated only in dot-and-dashed lines. For the fastening and tensioning of the saw blade 21 there serves ultimately a threaded, knurled nut 22, which is seated on the upper end of the threaded centering pin 14. The nut 22 may be used to tension the clamping jaws 18, 12 against each other. In order to make it possible to limit the axis of rotation 6 to a predetermined angular range, the clamping jaw 12 has an off-center pin 24 pointing vertically downward, which cooperates with a projection 25 extending radially away from the column 8. The projection 25 can be rigidly mounted and thus can act as a fixed stop, and also has a certain amount of play in the circumferential direction, in order to permit a rotation of the saw blades 21 through exactly 360° or another angle. Alternatively, the pin 24 can be provided with a certain amount of play for this same purpose.

On the upper side of the plate forming the base stand 2 there is fastened a guide rail 27, the lengthwise extent of which, as is evident especially from FIG. 4, is aligned radially to the axis of rotation 6. The guide rail 27 serves for the linear bearing of a slide block 28, on the upper side of which a measuring arrangement 29 is held, which is drivable with the slide block 28 in common between two end stops 32. The end stops 32 are formed by pins admitted through the plate of the base stand 2.

Figure 5:
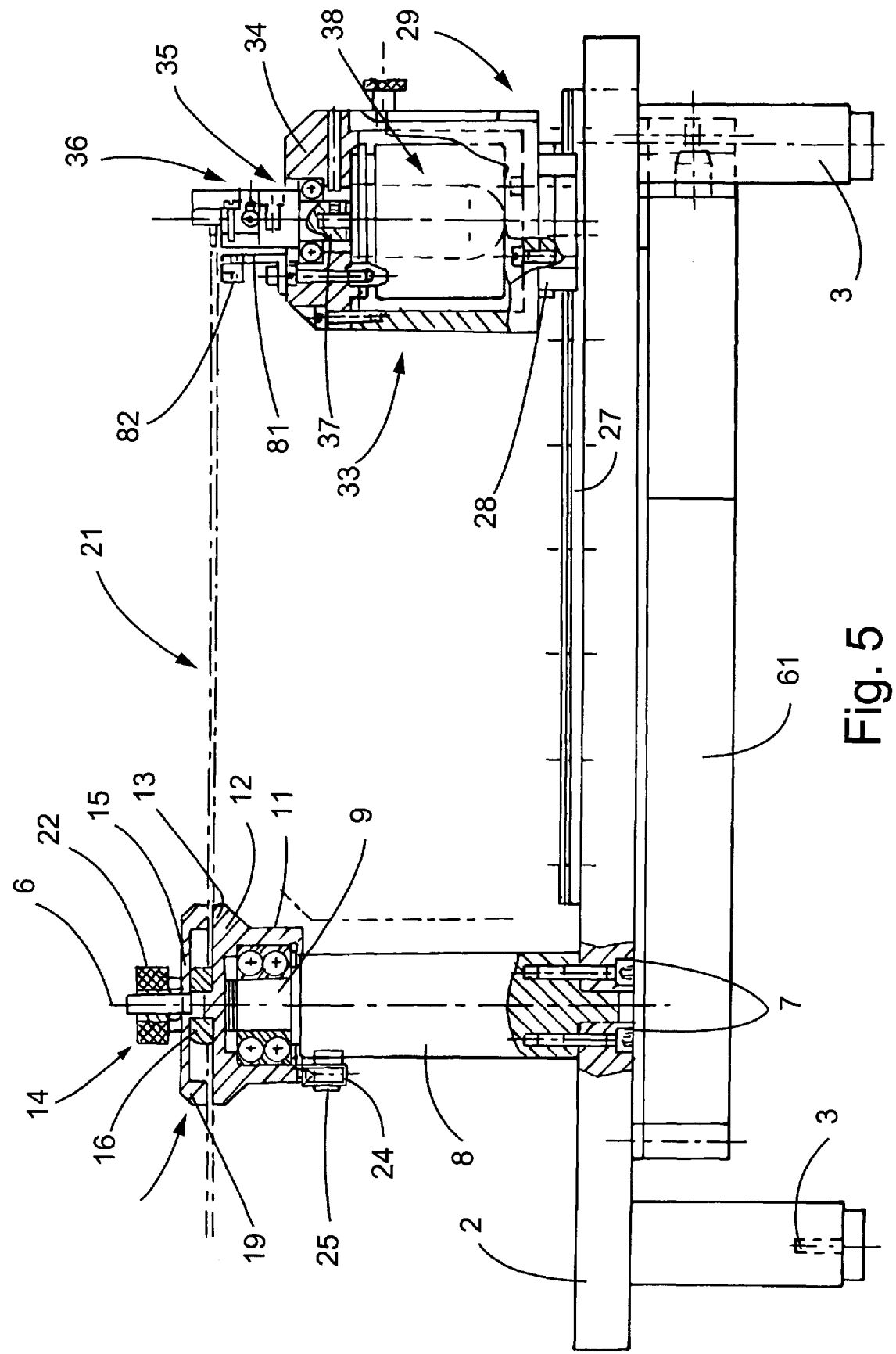
FIG. 5 illustrates a partially sectioned view of the measuring apparatus illustrated in FIGS. 1 and 4.

The construction of the measuring arrangement 29 is especially evident from FIGS. 2, 3 and 5. The measuring arrangement has a housing 33 which is joined firmly with the slide block 28 by means of machine screws. The housing is provided with a cover 24 which closes off the interior space of the housing. In the cover there is provided a passage opening, in which there is held a roller bearing such as, for example, a ball bearing 35. This supports a measuring spindle 36 which has a section 37 extending into the interior of the housing 33, in a technical sense substantially free of adhesive friction. The measuring spindle 36 is connected with a measuring system 38 which detects with sufficient precision the rotation and angular position of the measuring spindle 36.

As is evident especially from FIG. 2, the measuring spindle is provided on its face side 40 with two measuring edges 41, 42. For this the measuring spindle 36 has at its upper end a vertically projecting projection 43, the plan view of which is circular segmental. It is bounded by two plane surfaces 44, 45, to be seen, for example, from FIG. 3, both of which end approximately on a pivot axis 46 established by the roller bearing 35.

The measuring edge 41 has a plane surface extending above projections 43, which plane surface lies in a common plane with the plane surface 44 when the measuring edge 41 is tensioned against the plane surface 44 by means of a corresponding fastening screw 48. The measuring edge 42 also has a plane surface 51 which lies against the plane surface 45 and which extends vertically upward beyond the projection 43. The plane surfaces 47, 51 meet, accordingly, on the pivot axis 46. It may also be sufficient for the measuring edge 41 not to extend to the pivot axis 46, so that between the measuring edge 41 and the plane surface 51 of the measuring edge 42 there remains more or less a gap. In this case, the pivot axis 46 no longer lies on the border of the plane surface 47, but it does lie in a plane that also contains the plane surface 47.

The measuring edge 42 serves to be positioned against the surface of a saw tooth 52 of the saw blade 21. For this purpose, the measuring edge 42 is somewhat tapered on its side facing away from the saw blade 21 whereby the measuring edge may find its way also into interspaces between the saw blade teeth. As illustrated in FIG. 3, the measuring edge 42 can be tensioned firmly against the plane surface 45 by means of a machine screw 53.

Preferably, the measuring edge 42 has an oblong hole, so that after the loosening of the screw 53 it can be thrust in the direction of the arrow 54 indicated in FIG. 2, parallel to the plane surface 45 and to its own plane surface, so that the pivot axis 46 lies in the plane surface 51 in every displacement position. In this manner, the measuring edge 42 is adaptable to interspaces of different depths. Accordingly, regardless whether the saw blade has large or small teeth, a good positioning of the measuring edge 42 with respect to the saw tooth is ensured. Alternatively, for this same purpose, a set of exchangeable measuring edges 42 of different size can be made ready, which then, if necessary, are joined with the measuring spindle 36.

For the swinging of the measuring spindle 36 about its pivot axis 46, there serves handle 56 represented in FIG. 1, over-enlarged merely for the sake of illustration, and to be derived, for example, from FIG. 4, which handle is preferably constructed as short and light as possible. This construction serves to keep the mass inertia moment of the measuring spindle 36 and of all the parts associated with it, as low as possible for reasons to be explained later.

Figure 6:
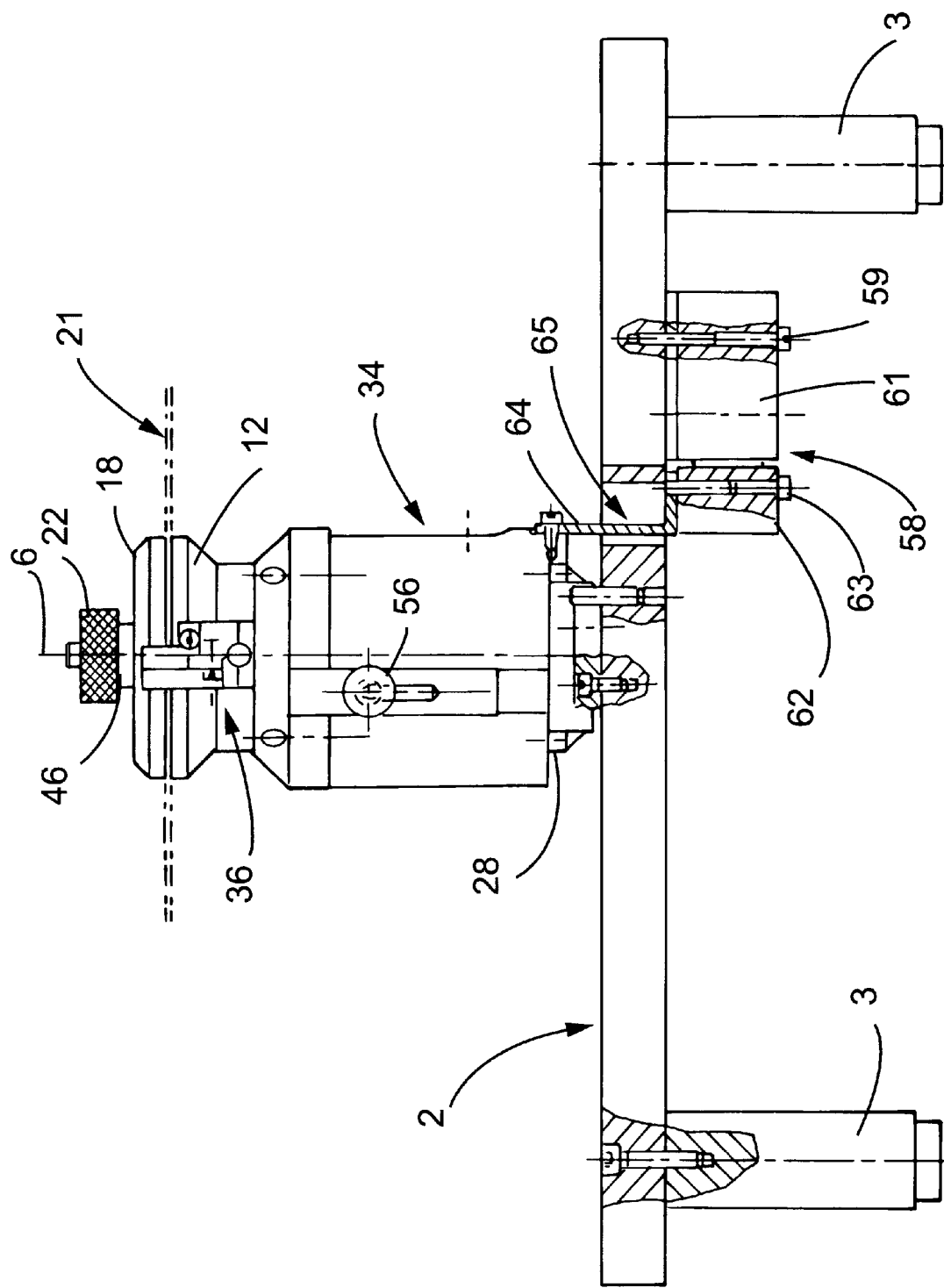
FIG. 6 illustrates a partly sectioned front view of the measuring apparatus illustrated in FIGS. 1, 4 and 5.

As is evident from FIGS. 1, 4 and 6, on the base stand 2, underneath its plate, there is arranged a sensor 58. The sensor 58 serves to detect the position of the slide block 28 and, therewith, the distance between the pivot axis 46 of the measuring spindle 36 and the axis of rotation 6 of the receptacle 5. The sensor 58 has a fixed part 61 connected by screws 59 with the base stand 2, and a movable part 62 which is connected by screws 63 with a holder 64, which grips through the base part 2 by means of a longitudinal slot 65 extending parallel to the guide rail 27. The longitudinal slot 63 extends over the entire path of movement of the slide block 28. The carrier 64 is connected firmly, with its end away from the movable part 62 of the sensor 58, which extends above the plate of the base stand 2 through the longitudinal slot 65, with the slide block 28. The sensor 58, as indicated in FIG. 1, gives a signal to an evaluating unit 66 which is provided with an indicating arrangement 67. Over connecting lines 68 the evaluating arrangement 66 receives signals not only from the sensor 58, but furthermore from the sensor arrangement 38, which is constructed as an angle-giver. The indicating arrangement 67 has corresponding display fields 71, 72, 73 for the display of the relief angle, of the cutting angle, and of the saw blade diameter. In addition, a display field 74 can be provided for the indication of the number of teeth.

In order to determine the number of teeth of the saw blade 21 for display on the display field 74, as illustrated in FIG. 5, on the cover 44 of the housing 33 there is arranged a holder 81, which holds, for example, a magnetic sensor 82 directly underneath the plane of the saw blade 21. The sensor 82 detects whether, in its vicinity or over it, there stands a tooth or a tooth gap, and which, by passage from the tooth to the tooth gap or vice versa, delivers a signal. This is fed to the evaluating arrangement 66.

The evaluating unit 66 can be connected over a further line 82 with a processing machine, such as for example a grinding machine, which is adjusted in correspondence to the data ascertained with the measuring device 1.

The measuring device 1 so far described operates as follows:

For the measuring of a saw blade 21, the measuring spindle 36 with the slide block 28 is first driven into a radially outer position, which, as FIG. 4 shows, permits, for example, the mounting of a large saw blade 21a. With small saw blades 21b, a short distance between the measuring spindle 36 and the receptacle 5 suffices for mounting a saw blade. For the mounting of the saw blade, the knurled nut 22 and the clamping jaw 18 are moved, a suitable centering 16 is emplaced, the saw blade is laid on the centering ring and the plane surface 13 and subsequently the clamping jaw 18 is emplaced and clamped fast with the knurled nut 22. The saw blade 21 is thus held in the manner represented in FIG. 5 in dot-and-dashed lines.

With the aid of the handle 46, the measuring spindle 36 is turned so that the plane surface 51 of the measuring edge 42 is adjusted to a somewhat greater cutting angle than is supposed on saw blade 22. The measuring spindle 36 is then brought up in radial direction to the saw blade 21, so that the cutting edge or tip of the respective tooth 52 lies in the vicinity of the pivot axis 46 against the outer measuring edge 41, i.e. of its plane surface 47. In this stage the plane surface 51 does not yet lie linearly on the cutting surface. Rather, the measuring edge 42 with its edge 85 facing the saw blade 21, lies on the cutting surface. If the saw blade 21 is now turned by hand somewhat toward the measuring spindle 36, the tooth 52 presses the measuring edge 42 in linear engagement. Simultaneously, the tip of the tooth 52 comes into the corner defined between the plane surfaces 47, 51.

As low as possible a mass inertia moment for the measuring spindle 36 and a bearing with low friction and low play, are preferred during this process. The low weight and therefore the low inertia moment in the construction of the measuring spindle 36, in conjunction with the adhesive friction-low or adhesive friction-free bearing of the measuring spindle 36, ensures that the measuring spindle, in the described measuring process, rotates only so far that the plane surface 51 lies aligned on the cutting surface of the tooth 52 and does not move beyond the desired objective, i.e. continues to turn with momentum. In order to support the measurement, a spring can be provided which pre-tension the measuring spindle 36 with low force in a prescribed or optional turning direction. Furthermore, adhesive friction-free damping elements, such as eddy current brakes, can be provided. For this there suffices, for example, a permanent magnet accommodated in the housing 33, acting on the measuring spindle 36 or on parts connected with this.

When the plane surface 51 lies on the cutting surface of the tooth 52, the radial cutting angle is detected by the evaluating arrangement 66, which receives corresponding signals from the sensor arrangement 38. For the measurement of the release angle of the saw tooth, the measuring spindle can be swung by hand so far that the plane surface 47 lies on the outside of the tooth 52. Furthermore, it is also possible to set the measuring spindle on a somewhat greater than expected free angle, and then to drive the measuring spindle 46 so that the measuring spindle 36 automatically swings into the release angle position of the saw tooth in which the plane surface 47 lies linearly on the release surface of the saw tooth 52. In this case the measurement of the cutting angle occurs by movement of the tooth 52 in a circumferential direction (rotation of the saw blade about the axis of rotation 6 over a small angular range) and the measurement of the release angle takes place by movement of the measuring spindle 36 in a radial direction. In this position of the saw blade 21 and of the measuring spindle 36, the tooth 52 points with its tip at the pivot axis 46 into the corner between the measuring edges 41, 42 and the distance between the pivot axis 46 and the axis of rotation 6 corresponds to the outside diameter of the saw blade 21. The outside diameter is detected by the sensor means 58 and forwarded to the evaluating arrangement 66.

If the number of teeth is to be determined, the measuring spindle is shifted outward somewhat in radial direction, as it is driven with the slide block 28 away from the receptacle 5 until the tooth 52 of the saw blade 21 no longer engages into the measuring edges 41, 42. The saw blade 21 is now rotated over the rotary range that is given by the projection 25 and the pin 24 (FIG. 5). The number of tooth passages detected by the sensor 82 is then displayed as the number of teeth by the evaluating arrangement 66.

It is also contemplated that the apparatus can be supported by an optical recording arrangement such as camera. The camera can then serve for the recording and observation of the tooth form. The image can be reproduced and enlarged on a monitor, and be further processed by means of an conventional evaluating arrangement. It is possible, furthermore, to use a line-camera that is focused or will be focused on a tooth flank. The line-camera can replace at least one of the mechanical measuring edges and it forms an optical measuring edge with its view field linear in cross section.

It is further contemplated that the values for the cutting surface angles and release surface angles measured using the subject invention can be forwarded directly to a grinding machine. In this manner, these measurements are available for use by the grinding machine for the sharpening of the saw blade. This arrangement facilitates the setting up of a corresponding grinding machine and makes it possible to treat different saw blades in succession without the need for re-equiping the apparatuses.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A device for measuring saw blades, comprising:

a base stand;

a receptacle turnably borne on the base stand about an axis of rotation and adapted to releasably engage the saw blade;

a measuring spindle borne swingably about a pivot axis parallel to the axis of rotation of the receptacle;

a handle associated with the measuring spindle for use in swinging the measuring spindle;

a first measuring edge having a first plane surface releasably connected with the measuring spindle such that the pivot axis of the measuring spindle runs in a first plane defined by the first plane surface when the first measuring edge is connected with the measuring spindle;

a second measuring edge which has a second plane surface connected with the measuring spindle such that the pivot axis of the measuring spindle runs in a second plane defined by the second plane surface when the second measuring edge is connected with the measuring spindle;

a first sensor arrangement associated with the measuring spindle for detecting the angular position of the measuring spindle, the first sensor arrangement delivering an output signal that characterizes the rotary position of the measuring spindle; and an evaluating arrangement for determining angular measurement values as a function of the output signal.

2. The device as recited in claim 1, wherein the measuring spindle is adapted to be slidably borne on the base stand in a direction radial with respect to the axis of rotation.

3. The Device as recited in claim 2, further comprising a second sensor arrangement which delivers a signal characterizing the radial position of the measuring spindle to the evaluating arrangement.

4. The device as recited in claim 1, wherein the receptacle is adapted to be slidably borne on the base stand in a direction radial with respect to the axis of rotation.

5. The device as recited in claim 4, further comprising a second sensor arrangement that delivers a signal characterizing the radial position of the receptacle to the evaluating arrangement.

6. The device as recited in claim 1, wherein the first plane surface of the first measuring edge and the second plane surface of the second measuring edge enclose an angle between them.

7. The device as recited in claim 6, wherein the angle enclosed by the first and second plane surfaces is a right angle.

8. The device as recited in claim 1, wherein the edge of the second plane surface of the second measuring edge is arranged so as to touch the first plane surface of the first measuring edge.

9. The device as recited in claim 1, wherein the first measuring edge is adjustably held on the measuring spindle in a direction which is parallel to the first plane surface and rectangular to the pivot axis.

10. The device as recited in claim 1, wherein the measuring spindle is moveable such that the first measuring edge is swingable into a position in which the first plane surface is aligned in a radial direction with respect to the axis of rotation.

11. The device as recited in claim 10, wherein the measuring spindle is moveable such the second measuring edge is swingable into a position in which the second plane surface is aligned in a circumferential direction with respect to the axis of rotation.

12. The device as recited in claim 1, further comprising a detection arrangement borne by the base stand for determining the number of teeth present on a saw blade.

13. The device as recited in claim 12, wherein the detection arrangement is a magnetic detection arrangement which has an element having an inductance the amount of which is dependent on whether a tooth or a tooth interspace of the saw blade stands over the detection arrangement.

14. The device as recited in claim 1, wherein the receptacle has a restricted turning range.

15. The device as recited in claim 14, wherein the turning range is restricted to 360 degrees.

16. The device as recited in claim 1, wherein the second measuring edge is detachably joined with the measuring spindle.

17. The device as recited in claim 1, further comprising an optical viewing arrangement in communication with the evaluating arrangement for optically measuring a saw tooth angle.

18. The device as recited in claim 17, wherein the optical viewing arrangement is connected with the measuring spindle and is positionable thereby.

19. The device as recited in claim 17, wherein the optical viewing arrangement comprises a camera.

* * * * *